(12) United States Patent
Donovan et al.

(10) Patent No.: US 11,691,709 B1
(45) Date of Patent: Jul. 4, 2023

(54) APPARATUS FOR AN ELECTRIC AIRCRAFT WITH INCREASED CRASH ROBUSTNESS

(71) Applicant: BETA AIR, LLC, South Burlington, VT (US)

(72) Inventors: Sean Donovan, Richmond, VT (US); Nathan William Joseph Wiegman, Williston, VT (US); Braedon Lohe, Essex Junction, VT (US); Sam Wagner, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/852,262

(22) Filed: Jun. 28, 2022

(51) Int. Cl.
| | | |
|---|---|---|
| B64C 1/06 | (2006.01) | |
| B64D 27/24 | (2006.01) | |
| B60L 50/60 | (2019.01) | |
| B60L 58/26 | (2019.01) | |
| B60L 50/64 | (2019.01) | |
| B64C 29/00 | (2006.01) | |

(52) U.S. Cl.
CPC ............ *B64C 1/062* (2013.01); *B60L 50/64* (2019.02); *B60L 50/66* (2019.02); *B60L 58/26* (2019.02); *B64D 27/24* (2013.01); *B60L 2200/10* (2013.01); *B64C 29/0025* (2013.01)

(58) Field of Classification Search
CPC ..... B64C 1/062; B64C 29/0025; B60L 50/64; B60L 50/66; B60L 58/26; B60L 2200/10; B64D 27/24
See application file for complete search history.

(56) References Cited

U.S. PATENT DOCUMENTS

| | | | |
|---|---|---|---|
| 11,394,078 B1* | 7/2022 | Donovan | ............ H01M 50/204 |
| 11,476,676 B1* | 10/2022 | Lohe | ..................... H02J 7/0013 |
| 2010/0151300 A1* | 6/2010 | Gutsch | ............. H01M 10/6568 |
| | | | 429/61 |
| 2011/0033742 A1* | 2/2011 | Maier | ................. H01M 50/258 |
| | | | 165/104.31 |
| 2019/0081370 A1* | 3/2019 | Capati | ................. H01M 10/482 |
| 2022/0077443 A1* | 3/2022 | Donovan | ............ H01M 50/249 |
| 2022/0250508 A1* | 8/2022 | Donovan | ................ B60L 50/64 |

OTHER PUBLICATIONS

WO 2011/146919 A2 document published Nov. 24, 2011 to Wayne et al.*

* cited by examiner

*Primary Examiner* — Pamela Rodriguez
(74) *Attorney, Agent, or Firm* — Caldwell Intellectual Property Law

(57) ABSTRACT

An aircraft with increased crash robustness including a fuselage with a forward end, an opposite rear end, a ventral surface, and a dorsal surface. The aircraft further including a longitudinal axis running from the rear end to the forward end and a dorsoventral axis orthogonal to the longitudinal axis and running from the dorsal surface to the ventral surface. The aircraft also including at least a battery module located within the fuselage comprising a plurality of battery cells, each battery cell includes an axial axis positioned orthogonally to each of the longitudinal axis and the dorsoventral axis, and each battery cell has a plurality of radial axes orthogonal to the axial axis, wherein the plurality of radial axes includes a first radial axis aligned with the longitudinal axis and a second radial axis aligned with the dorsoventral axis.

20 Claims, 11 Drawing Sheets

US 11,691,709 B1

APPARATUS FOR AN ELECTRIC AIRCRAFT WITH INCREASED CRASH ROBUSTNESS

FIELD OF THE INVENTION

The present invention generally relates to the field of electric aircraft design. In particular, the present invention is directed to an apparatus for an electric aircraft with increased crash robustness.

BACKGROUND

It is important, when designing an aircraft, that the aircraft is designed to be as safe as possible in the event of a crash. Electric aircraft carry batteries full of hazardous material. Additionally, the batteries can cause conflagrations if they enter thermal runaway. Thus, the batteries of electric aircraft can pose a problem, and a danger, in the event of a crash. Existing solutions to this problem are not satisfactory.

SUMMARY OF THE DISCLOSURE

In an aspect an aircraft with increased crash robustness, the aircraft including a fuselage, wherein the fuselage has a forward end, an opposite rear end, a ventral surface, and a dorsal surface. The aircraft further including a longitudinal axis running from the rear end to the forward end and a dorsoventral axis orthogonal to the longitudinal axis and running from the dorsal surface to the ventral surface. The aircraft also including at least a battery module located within the fuselage, wherein the at least a battery module comprises a plurality of battery cells, each battery cell of the plurality of battery cells includes an axial axis positioned orthogonally to each of the longitudinal axis and the dorsoventral axis, and each battery cell of the plurality of battery cells has a plurality of radial axes orthogonal to the axial axis, wherein the plurality of radial axes includes a first radial axis aligned with the longitudinal axis and a second radial axis aligned with the dorsoventral axis.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses for an aircraft with increased crash robustness. This increased crash robustness arises from the particular orientation of the battery modules within the aircraft and, particularly, the orientation of the battery cells within those modules. In some embodiments, it may be advantageous to orient the radial direction of the battery cells such that they face the expected impact directions of the expected impacts that the aircraft is most likely to sustain. This may prevent harmful effects such as electrolyte leakage and the triggering of thermal runaway in the event of a crash; thus, leading to increased crash robustness.

In certain aspects of this invention, an active cooling system may be implemented to provide cooling to the battery module or modules. This may help maintain the battery cells at an optimal working temperature and avoid thermal runaway. Furthermore, in certain aspects, a pack monitoring system including a pack monitoring unit and a sensor may be incorporated to gather and record data pertaining to the battery modules and any battery packs to which the battery modules may belong.

Figure 1:
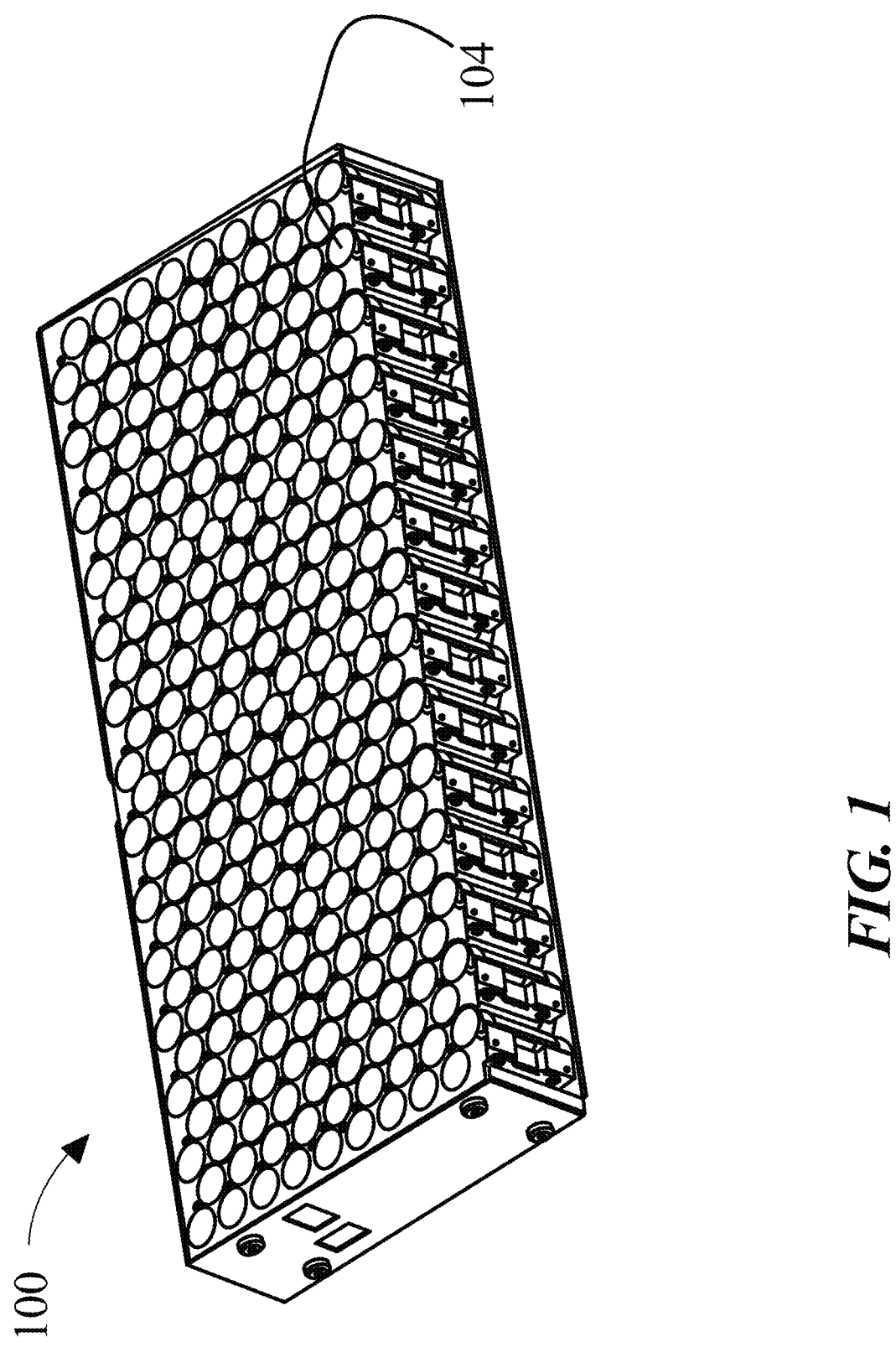
FIG. 1 is an illustration of an exemplary embodiment of a battery module.

Referring now to FIG. 1, an exemplary battery module 100 is depicted. A "battery module" contains plurality of battery cells that have been wired together in series, parallel, or a combination of series and parallel, wherein the "battery module" holds the battery cells in a fixed position. Battery module 100 may be consistent with any battery module disclosed in U.S. application Ser. No. 16/948,140, filed on Sep. 4, 2020, and entitled "SYSTEM AND METHOD FOR HIGH ENERGY DENSITY BATTERY MODULE," or U.S. application Ser. No. 16/948,157, filed on Sep. 4, 2020, and entitled "SYSTEM AND METHOD FOR HIGH ENERGY DENSITY BATTERY MODULE," both of which are hereby incorporated in their entirety by reference. Battery module 100 may be consistent with any battery module disclosed in U.S. application Ser. No. 17/665,454, filed on Feb. 4, 2022, and entitled "AN APPARATUS FOR A GROUND-BASED BATTERY MANAGEMENT FOR AN ELECTRIC AIRCRAFT," the entirety of which is hereby incorporated by reference.

With continued reference to FIG. 1, battery module 100 includes a plurality of battery cells 104. For the purposes of this disclosure, a "battery cell" is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. In some embodiments, battery module 100 may include cylindrical battery cells. For the purposes of this disclosure, cylindrical battery cells are round battery cells that have a larger height than diameter.

Figure 2:
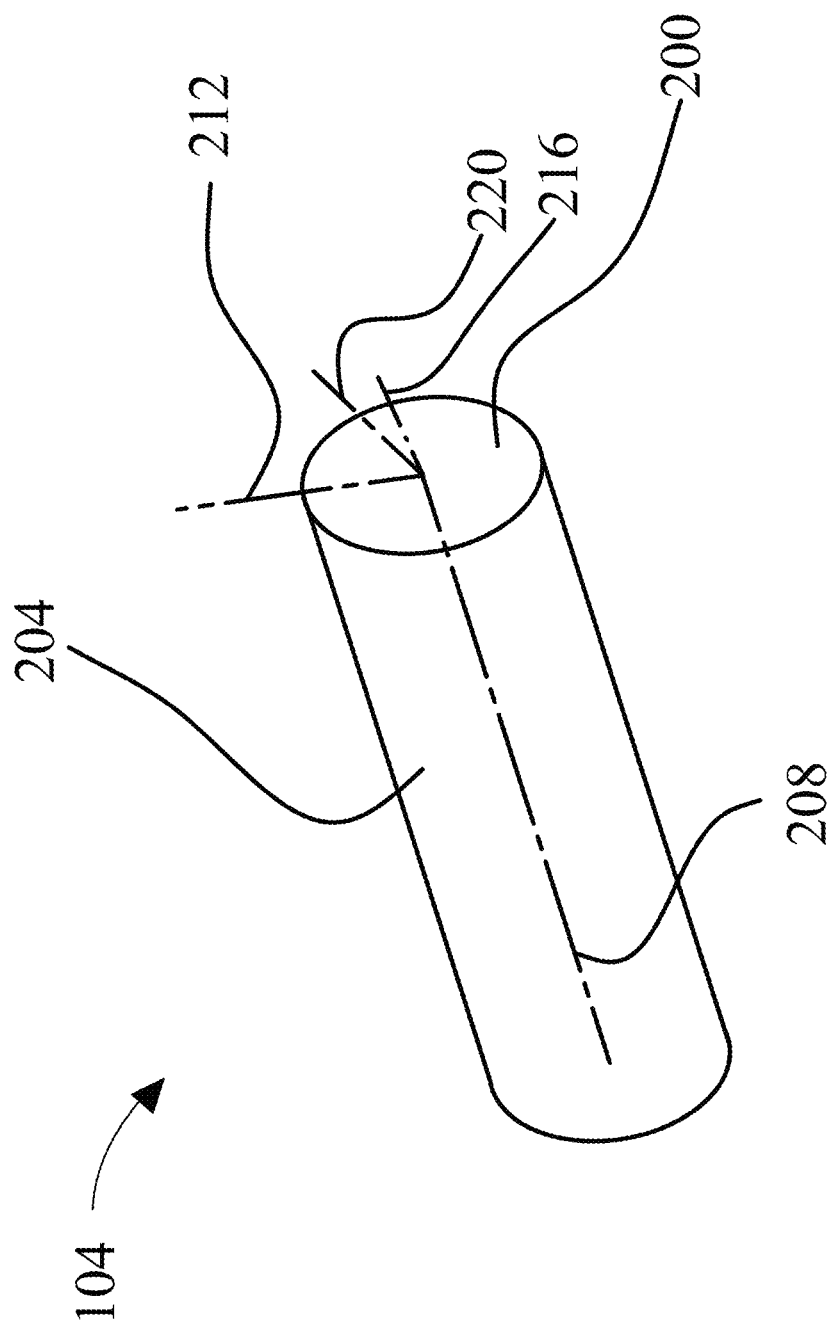
FIG. 2 is an illustration of an exemplary embodiment of a battery cell.

Referring now to FIG. 2, a depiction of a battery cell 104 is shown. Battery cell 104 may include two opposing circular surfaces 200. In FIG. 2, one of the circular surfaces 200 is shown, while the other is hidden from view. The circular surfaces 200 may be connected by a cylindrical surface 204.

With continued reference to FIG. 2, battery cell 104 has an axial axis 208. An "axial axis," for the purposes of this disclosure, is the axis extending down the axis of radial symmetry for battery cell 104. In some embodiments, axial axis 208 may extend between circular surfaces 200. In some embodiments, axial axis 208 may be parallel to cylindrical surface 204.

With continued reference to FIG. 2, battery cell 104 has a plurality of radial axes. A "radial axis" for the purpose of this disclosure, is an axis extending orthogonally from a body's axis of radial symmetry, or axial axis, to the outer border of the body. As a nonlimiting example, a radial axis of battery cell 104 may extend from axial axis 208 of battery cell 104 to cylindrical surface 204 of battery cell 104. As a non-limiting example, in some embodiments, battery cell 104 may have a first radial axis 212 and a second radial axis 216. In some embodiments, first radial axis 212 and second radial axis 216 may be orthogonal to each other. One of ordinary skill in the art would appreciate that first radial axis 212 and second radial axis 216 are merely a few exemplary radial axes that battery cell 104 may have. For example, as depicted, battery cell 104 may have a third radial axis 220. As a non-limiting example, battery cell 104 may have a plurality or radial axes extending in every radial direction from axial axis 208.

Figure 3:
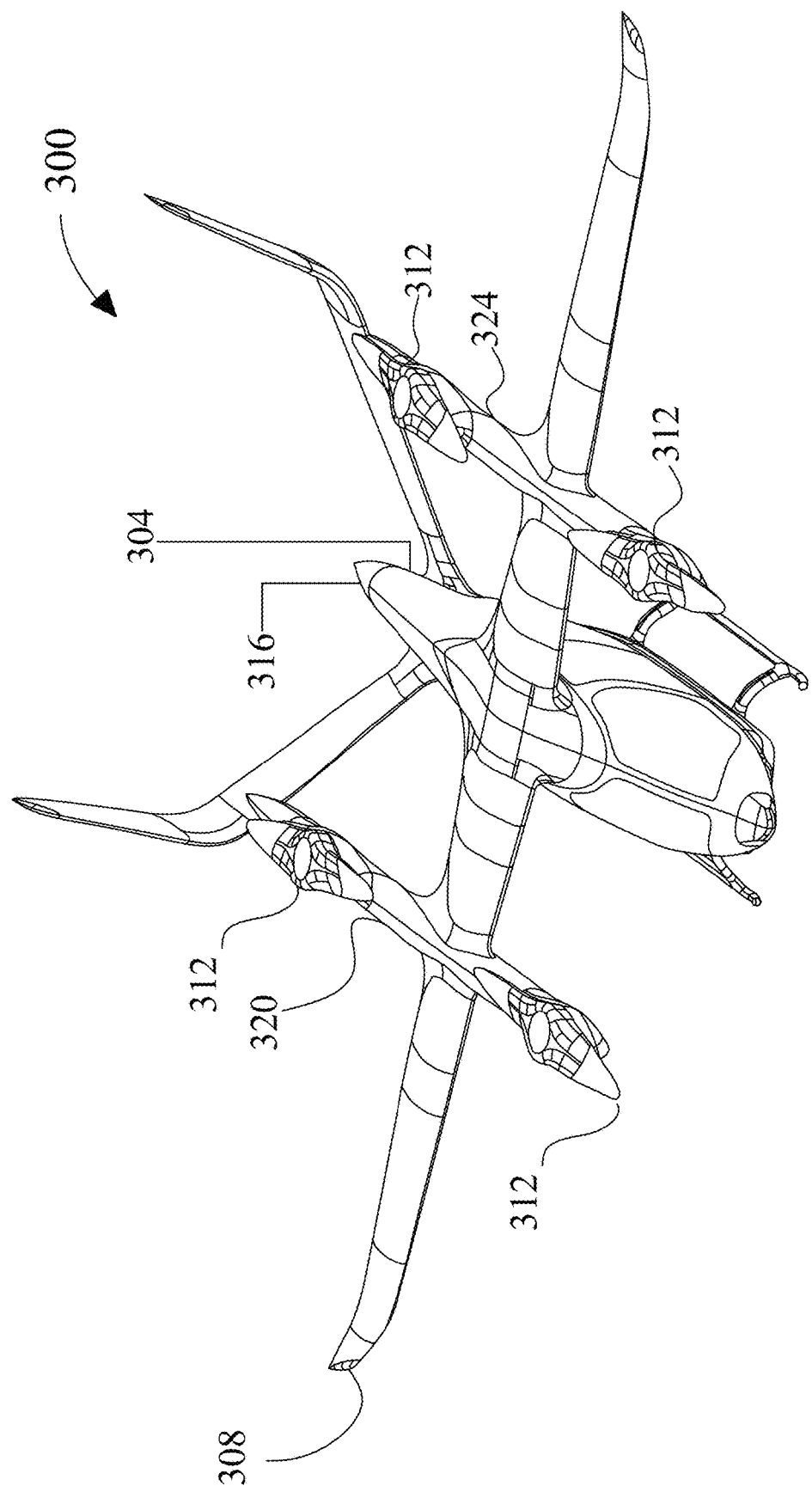
FIG. 3 is an illustration of an exemplary embodiment of an electric aircraft.

Referring now to FIG. 3, an exemplary embodiment of an electric aircraft 300 is illustrated. Electric aircraft 300 may include an electrically powered aircraft. In some embodiments, electrically powered aircraft may be an electric vertical takeoff and landing (eVTOL) aircraft. Electric aircraft 300 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

In an embodiment, and still referring to FIG. 3, electric aircraft 300 may include a fuselage 304. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 304 may comprise structural elements that physically support the shape and structure of an aircraft. Structural elements may take a plurality of forms, alone or in combination with other types. Structural elements may vary depending on the construction type of aircraft and specifically, the fuselage. Fuselage 304 may comprise a truss structure. A truss structure is often used with a lightweight aircraft and includes welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 304 may comprise geodesic construction. Geodesic structural elements may include stringers wound about formers (which may be alternatively called station frames) in opposing spiral directions. A stringer, as used herein, is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 304 orthogonal to the longitudinal (nose to tail) axis of the aircraft and forms the general shape of fuselage 304. A former may comprise differing cross-sectional shapes at differing locations along fuselage 304, as the former is the structural element that informs the overall shape of a fuselage 304 curvature. In embodiments, aircraft skin can be anchored to formers and strings such that the outer mold line of the volume encapsulated by the formers and stringers includes the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 3, fuselage 304 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

Still referring to FIG. 3, fuselage 304 may include a semi-monocoque construction. Semi-monocoque construction, as used herein, is a partial monocoque construction, wherein a monocoque construction is describe above detail. In semi-monocoque construction, fuselage 304 may derive some structural support from stressed aircraft skin and some structural support from underlying frame structure made of structural elements. Formers or station frames can be seen running transverse to the long axis of fuselage 304 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art, upon reviewing the entirety of this disclosure, will appreciate that there are various potential methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 3, it should be noted that an illustrative embodiment is presented only, and this disclosure in no way limits the form or construction of electric aircraft. In embodiments, fuselage 304 may be configurable based on the needs of the electric per specific mission or objective. The general arrangement of components, structural elements, and hardware associated with storing and/or moving a payload may be added or removed from fuselage 304 as needed, whether it is stowed manually, automatedly, or removed by personnel altogether. Fuselage 304 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 304 may also be configurable to accept certain specific cargo containers, or a receptable that can, in turn, accept certain cargo containers.

Still referring to FIG. 3, fuselage 304 includes an energy source. An "energy source," for the purposes of this disclosure, is a store of electrical power. An energy source may include a battery cell, or a plurality of battery cells connected in series into a module and each module connected in series or in parallel with other modules. The battery cell, as a non-limiting example, may be consistent with battery cell 104 disclosed with respect to FIG. 1 and FIG. 2. As another non-limiting example, energy source may include one or more of battery module 100 disclosed with reference to FIG. 1. Configuration of an energy source containing connected modules may be designed to meet an energy or power requirement and may be designed to fit within a designated footprint in an electric aircraft in which electric aircraft may be incorporated.

In an embodiment, and still referring to FIG. 3, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 3, energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. Persons skilled in the art will be aware, after reviewing the entirety of this disclosure, of many different components of an energy source. Exemplary energy sources are disclosed in detail in U.S. patent application Ser. No. 16/948,157, filed Sep. 4, 2020, and entitled "SYSTEM AND METHOD FOR HIGH ENERGY DENSITY BATTERY MODULE." Furthermore, exemplary energy sources are also disclosed in detail in U.S. patent application Ser. No. 16/948,140, filed Sep. 4, 2020, and entitled "SYSTEM AND METHOD FOR HIGH ENERGY DENSITY BATTERY MODULE," which is incorporated in its entirety herein by reference.

Still referring to FIG. 3, electric aircraft includes at least a laterally extending element 308, wherein the at least a laterally extending element is attached to fuselage 304. As used in this disclosure a "laterally extending element" is an element that projects essentially horizontally from fuselage, including an outrigger, a spar, and/or a fixed wing that extends from fuselage. Laterally extending element 308 projects laterally from fuselage 304. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry includes an airfoil. Wing may include a leading edge. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. In an embodiment, and without limitation, trailing edge may include an edge capable of controlling the direction of the departing medium from the wing, such that a controlling force is exerted on the aircraft. Laterally extending element 308 may comprise differing and/or similar cross-sectional geometries over its cord length or the length from wing tip to where wing meets the aircraft's body. One or more wings may be symmetrical about the aircraft's longitudinal plane, which includes the longitudinal or roll axis reaching down the center of the aircraft through the nose and empennage, and the plane's yaw axis. Laterally extending element 308 may comprise controls surfaces configured to be commanded by a pilot or pilots to change a wing's geometry and therefore its interaction with a fluid medium, like air. Control surfaces may comprise flaps, ailerons, tabs, spoilers, slats, and the like.

Still referring to FIG. 3, electric aircraft may include at least a propulsor, such as lift propulsors 312 and pusher propulsor 316. The at least a propulsor is electrically connected to the energy source. In an embodiment, when a propulsor twists and pulls air behind it, it will, at the same time, push an aircraft forward with an equal amount of force. As a further non-limiting example, the propulsor may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward. may include a plurality of blades. As used in this disclosure a "blade" is a propeller that converts rotary motion from an engine or other energy source into a swirling slipstream. In an embodiment, blade may convert rotary motion to push the propeller forwards or backwards. In an embodiment the propulsors include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.4°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 3, the propulsors may include electric motors. The electric motor may be driven by direct current (DC) electric power and may include, without limitation, brushless DC electric motors, switched reluctance motors, induction motors, or any combination thereof. In some embodiments, the electric motors may be driven using alternating current (AC) electric power. A motor may also include electronic speed controllers or other components for regulating motor speed, rotation direction, and/or dynamic braking. The electric motors may be consistent with any electric motors disclosed in U.S. patent application Ser. No. 16/703,225, filed on Dec. 4, 2019, and titled "AN INTEGRATED ELECTRIC PROPULSION ASSEMBLY" or U.S. patent application Ser. No. 16/938,952, filed on Jul. 25, 2020, and titled "AN INTEGRATED ELECTRIC PROPULSION ASSEMBLY," the entirety of both are hereby incorporated by reference.

In an embodiment, and still referring to FIG. 3, lift propulsor 312 may be configured to provide lift to electric aircraft 300. As used in this disclosure a "lift" is a perpendicular force to the oncoming flow direction of fluid surrounding the surface. For example, and without limitation relative air speed may be horizontal to electric aircraft, wherein the lift force may be a force exerted in the vertical direction, directing electric aircraft upwards. In some embodiments, the at least a lift propulsor 312 may comprise two lift propulsors. In some embodiments, each of these two lift propulsors may be connected to the laterally extending element 308.

Still referring to FIG. 3, electric aircraft 300 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 3, a number of aerodynamic forces may act upon the electric aircraft during flight. Forces acting on electric aircraft 300 during flight may include, without limitation, thrust, the forward force produced by the rotating element of the electric aircraft and acts parallel to the longitudinal axis. Another force acting upon electric aircraft 300 may be, without limitation, drag, which may be defined as a rearward retarding force which is caused by disruption of airflow by any protruding surface of the electric aircraft 300 such as, without limitation, the wing, rotor, and fuselage. Drag may oppose thrust and acts rearward parallel to the relative wind. A further force acting upon electric aircraft 300 may include, without limitation, weight, which may include a combined load of the electric aircraft 300 itself, crew, baggage, and/or fuel. Weight may pull electric aircraft 300 downward due to the force of gravity. An additional force acting on electric aircraft 300 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 300 are designed to be as lightweight as possible. Reducing the weight of the aircraft and designing to reduce the number of components is essential to optimize the weight. To save energy, it may be useful to reduce weight of components of electric aircraft 300, including without limitation propulsors and/or propulsion assemblies. In an embodiment, motor may eliminate need for many external structural features that otherwise might be needed to join one component to another component. Motor may also increase energy efficiency by enabling a lower physical propulsor profile, reducing drag and/or wind resistance. This may also increase durability by lessening the extent to which drag and/or wind resistance add to forces acting on electric aircraft 300 and/or propulsors.

Still referring to FIG. 3, the at least a propulsor of electric aircraft 300 may include at least a pusher propulsor 316. As used in this disclosure a "pusher propulsor" is a flight component that is mounted such that the component generates forward thrust through the medium. Pusher propulsor 316 may be configured to provide forward thrust to electric aircraft 300. As a non-limiting example pusher propulsor 316 may include a pusher flight component such as a pusher propeller, a pusher motor, a pusher propulsor, and the like. Additionally, or alternatively, pusher flight component may include a plurality of pusher flight components. In some embodiments, the at least a pusher propulsor 316 may be connected to the tail end of the electric aircraft. For the purposes of this disclosure, the "tail end" of an aircraft is the back end of the aircraft, oftentimes close to the aircraft's tail. As depicted in FIG. 3, pusher propulsor 316 is connected to the tail end of electric aircraft 300.

Still referring to FIG. 3, in some embodiments, aircraft 200 may include a first propulsor boom 320. For the purposes of this disclosure, a "propulsor boom" is a support arm configured to support at least a propulsor. In some embodiments, first propulsor boom 320 may extend perpendicularly from laterally extending element 308. First propulsor boom 320 may be connected to the at least a laterally extending element 308. In some embodiments, a first lift propulsor 312 may be connected to the first propulsor boom 320. First lift propulsor, as a non-limiting example, may be either of the lift propulsors 312 connected to first propulsor boom 320.

Figure 4:
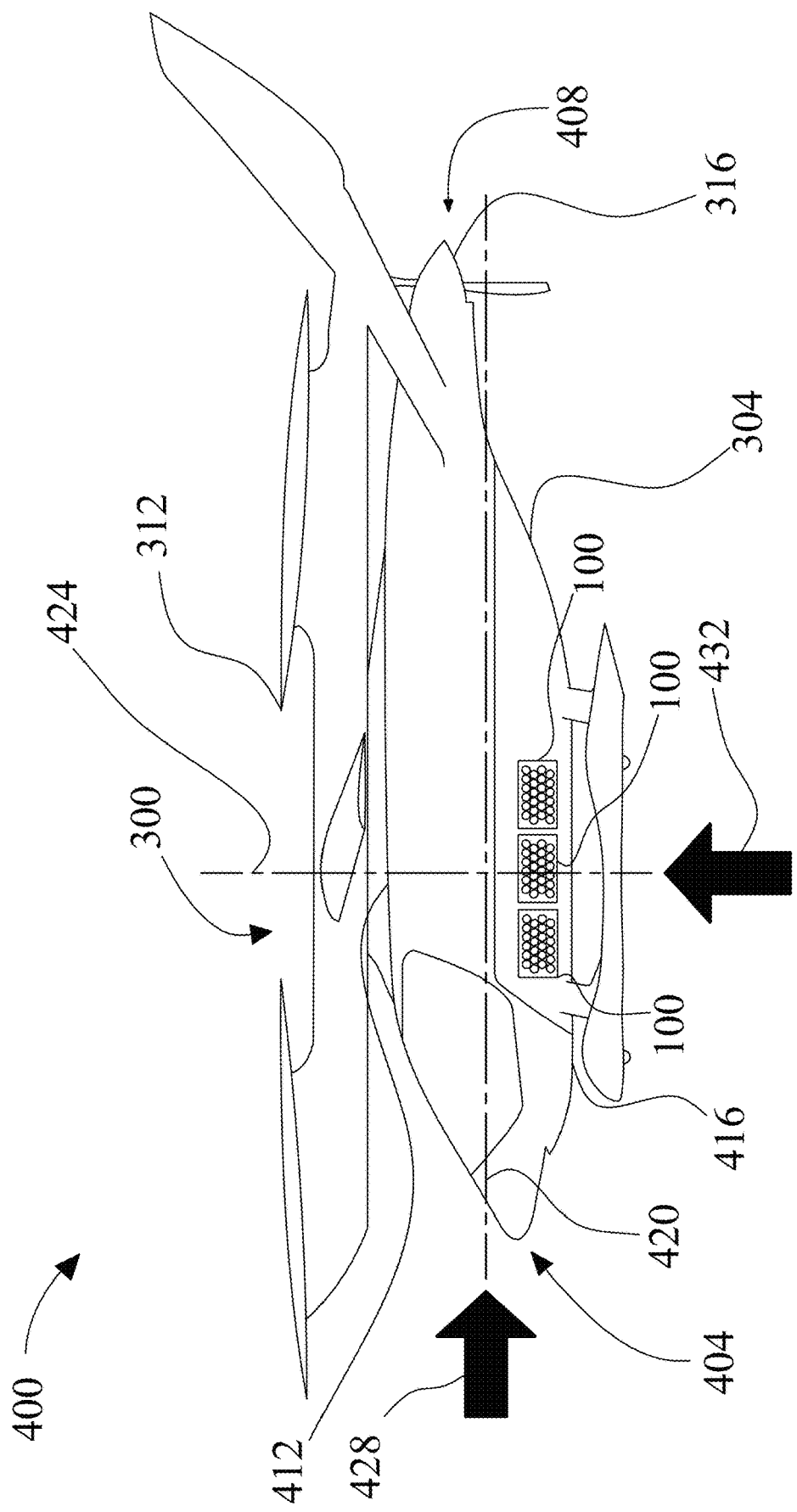
FIG. 4 is an illustration of an exemplary embodiment of an aircraft with increased crash robustness.

With continued reference to FIG. 3, in some embodiments, aircraft 200 may include a second propulsor boom 324. In some embodiments, second propulsor boom 324 may extend perpendicularly from laterally extending element 308. second propulsor boom 324 may be connected to the at least a laterally extending element 308. In some embodiments, a second lift propulsor 312 may be connected to the second propulsor boom 324. Second lift propulsor, as a non-limiting example, may be either of the lift propulsors 312 connected to second propulsor boom 324. Referring now to FIG. 4, an exemplary embodiment of an apparatus 400 for an aircraft with increased crash robustness. Apparatus 400 includes aircraft 300. Aircraft 300 includes a fuselage 304. Additionally, aircraft 300 may include a plurality of propulsors as described with reference to FIG. 3; particularly aircraft 300 may include one or more lift propulsors 312 and/or pusher propulsor 316.

With continued reference to FIG. 4, fuselage 304 has a forward end 404 and a rear end 408. A "forward end" of fuselage 304, for the purposes of this disclosure, is an end of the fuselage that faces the direction of travel during edgewise flight. A "rear end" of fuselage 304, for the purposes of this disclosure, is the end of fuselage that is opposite from the forward end.

With continued reference to FIG. 4, fuselage 304 has a dorsal surface 412 and a ventral surface 416. For the purposes of this disclosure, a "dorsal surface" is a bottom surface of a fuselage, wherein the bottom of the fuselage is defined as the portion of the fuselage that is closest to the ground. For the purposes of this disclosure, a "ventral surface" is a top surface of a fuselage, wherein the top of the fuselage is defines as the position of the fuselage that is farthest from the ground.

With continued reference to FIG. 4, fuselage 304 has a longitudinal axis 420 and a dorsoventral axis 424. A "longitudinal axis," for the purposes of this disclosure, is an axis, running from one end of the fuselage of an aircraft to the opposite end. Longitudinal axis 420 runs rear end 408 to a forward end 404. In some embodiments, longitudinal axis 420 may be parallel to or colinear with a fuselage reference line. A "fuselage reference line," for the purposes of this disclosure is a hypothetical straight line extending along a plane of symmetry of a fuselage, primarily used during the design phase of an aircraft. In some embodiments, longitudinal axis 420 may be referred to as the "roll axis." In some embodiments, longitudinal axis 420 may be an axis of symmetry for all of or a portion of fuselage 408.

With continued reference to FIG. 4, a "dorsoventral axis," for the purposes of this disclosure, is an axis that is orthogonal to a longitudinal axis, such that it passes through the top and bottom of the fuselage. Dorsoventral axis 424 is orthogonal to longitudinal axis 420. Dorsoventral axis 424 runs from dorsal surface 412 to ventral surface 416. Dorsoventral axis 424 may be said to be oriented in a vertical direction when aircraft 300 is in level, horizontal flight. For the purposes of this disclosure, "level, horizontal flight" is a mode of flight wherein the aircraft maintains a consistent altitude.

With continued reference to FIG. 4, apparatus 400 includes at least a battery module 100. Battery module 100 includes a plurality of battery cells 104. The at least a battery module 100 is located within fuselage 304. In some embodiments, the at least a battery module 100 may include a plurality of battery modules 100. Axial axis 208 is positioned orthogonally to each of longitudinal axis 420 and dorsoventral axis 424. Additionally, first radial axis 212, of the plurality of radial axes, is aligned with longitudinal axis 420 and second radial axis 216, of the plurality of radial axes, is aligned with dorsoventral axis 424. This is because battery cells 104 are able to withstand impact better when the impact is in the radial direction. This may lead to less electrolyte leakage and a decreased chance of triggering thermal runaway, thus increasing the safety and robustness of aircraft 300.

With continued reference to FIG. 4, the configuration of battery cells 104 discussed above may be chosen to increase the plurality of battery cells 104 ability to withstand an impact, such as an impact resulting from a crash. Fuselage 304 may be subject to a variety of expected impact directions. For the purposes of this disclosure, an "expected impact direction" is a direction from which an aircraft is expected to experience an impact.

With continued reference to FIG. 4, apparatus 400 includes first expected impact direction 428. In some embodiments, first expected impact direction 428 may be oriented along longitudinal axis 420. First expected impact direction 428 may represent a variety of possible impacts that aircraft 300 may sustain. For example, in some embodiments, first expected impact direction 428 may represent a nose-on impact. A "nose-on impact" for the purposes of this disclosure, is an impact wherein the aircraft collides nose first into an object. As a nonlimiting example, a nose-on impact may be an impact from the front of fuselage 304. As a nonlimiting example, a nose-on impact may arise when aircraft 300 flies into an object. Additionally, as another nonlimiting example, a nose-on impact may arise when aircraft 300 strikes the ground nose-first.

With continued reference to FIG. 4, apparatus 400 includes second expected impact direction 432. In some embodiments, second expected impact direction 432 may be oriented along dorsoventral axis 424. Second expected impact direction 432 may represent a variety of possible impacts that aircraft 300 may sustain. For example, in some embodiments, second expected impact direction 432 may represent a bottom-first impact. For the purposes of this disclosure, a "bottom-first impact" is an impact wherein the bottom, or belly, of the aircraft collides with an object before the rest of the aircraft body. As a nonlimiting example, a bottom-first impact may include an impact from the bottom of fuselage 304. As another nonlimiting example, a bottom-first impact may include aircraft 300 falling from a height and impacting the ground bottom first. As a nonlimiting example, this may occur if the lift propulsors fail. One of ordinary skill in the art would appreciate that first expected impact direction 428 and second expected impact direction 432 are not meant to represent the only two impact directions for aircraft 300, and, in fact, they only represent two common impact directions. Thus, in real life, the impact direction by which an aircraft will experience an impact is unlikely to be oriented, say, only along a vertical axis or only along a horizontal axis. In some embodiments, first expected impact direction 428 and second expected impact direction 432 may be 90 degrees apart.

Figure 5:
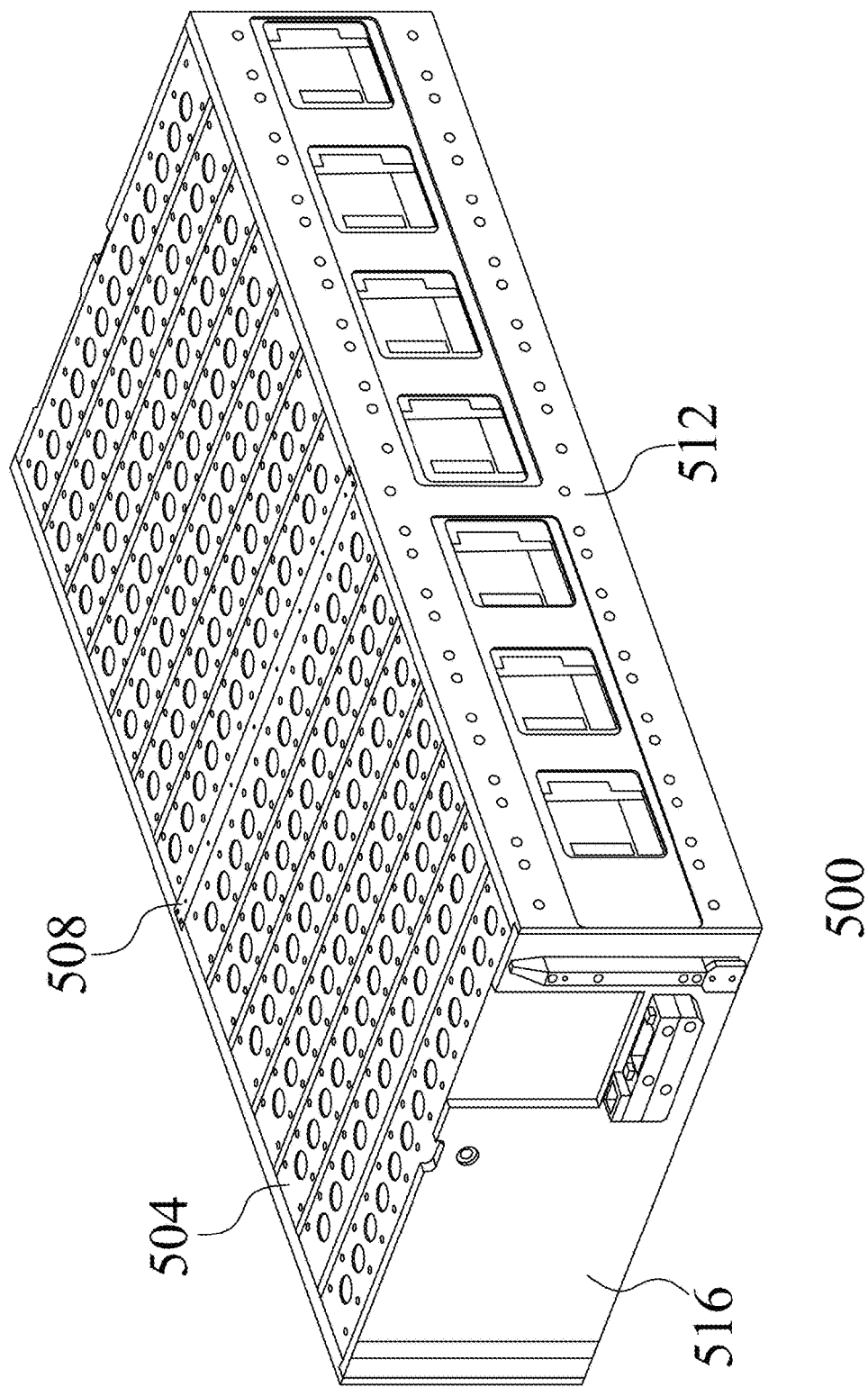
FIG. 5 is an illustration of an exemplary embodiment of a battery pack.

Referring now to FIG. 5, an exemplary embodiment of an aircraft battery pack 500 is illustrated. Battery pack 500 is a power source that is configured to store electrical energy in the form of a plurality of battery modules, which themselves are comprised of a plurality of electrochemical cells. In some embodiments, a battery module 100 is part of battery pack 500. In some embodiments, battery pack 500 comprises a plurality of battery modules 100. The battery modules may be wired together in series and in parallel. Battery pack 500 may comprise center sheet 508 which may comprise a thin barrier. The barrier may comprise a fuse connecting battery modules on either side of center sheet 508. The fuse may be disposed in or on center sheet 508 and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may comprise a thermal fuse, mechanical fuse, blade fuse, expulsion fuse, spark gap surge arrestor, varistor, or a combination thereof.

With continued reference to FIG. 5, battery pack 500 may also comprise a side wall 512 comprises a laminate of a plurality of layers configured to thermally insulate the plurality of battery modules 100 from external components of battery pack 500. Side wall 512 layers may comprise materials which possess characteristics suitable for thermal insulation as described in the entirety of this disclosure like fiberglass, air, iron fibers, polystyrene foam, and thin plastic films, to name a few. Side wall 512 may additionally or alternatively electrically insulate the plurality of battery modules 100 from external components of battery pack 500 and the layers of which may comprise polyvinyl chloride (PVC), glass, asbestos, rigid laminate, varnish, resin, paper, Teflon, rubber, and mechanical lamina. Center sheet 508 may be mechanically coupled to side wall 512 in any manner described in the entirety of this disclosure or otherwise undisclosed methods, alone or in combination. Side wall 512 may comprise a feature for alignment and coupling to center sheet 508. This feature may comprise a cutout, slots, holes, bosses, ridges, channels, and/or other undisclosed mechanical features, alone or in combination.

With continued reference to FIG. 5, battery pack 500 may also comprise an end panel 516 comprising a plurality of electrical connectors and further configured to fix battery pack 500 in alignment with at least a side wall 512. End panel 516 may comprise a plurality of electrical connectors of a first gender configured to electrically and mechanically couple to electrical connectors of a second gender. End panel 516 may be configured to convey electrical energy from battery cells to at least a portion of an aircraft. Electrical energy may be configured to power at least a portion of an aircraft or comprise signals to notify aircraft computers, personnel, users, pilots, and any others of information regarding battery health, emergencies, and/or electrical characteristics. The plurality of electrical connectors may comprise blind mate connectors, plug and socket connectors, screw terminals, ring and spade connectors, blade connectors, and/or an undisclosed type alone or in combination. The electrical connectors of which end panel 516 comprises may be configured for power and communication purposes.

With continued reference to FIG. 5, a first end of end panel 516 may be configured to mechanically couple to a first end of a first side wall 512 by a snap attachment mechanism, similar to end cap and side panel configuration utilized in the battery module. To reiterate, a protrusion disposed in or on end panel 516 may be captured, at least in part, by a receptacle disposed in or on side wall 512. A second end of end panel 516 may be mechanically coupled to a second end of a second side wall 512 in a similar or the same mechanism.

With continued reference to FIG. 5, battery pack 500 may be consistent with any battery pack disclosed in U.S. application Ser. No. 16/948,140, filed on Sep. 4, 2020, and entitled "SYSTEM AND METHOD FOR HIGH ENERGY DENSITY BATTERY MODULE," or U.S. application Ser. No. 16/948,157, filed on Sep. 4, 2020, and entitled "SYSTEM AND METHOD FOR HIGH ENERGY DENSITY BATTERY MODULE."

With continued reference to FIG. 5, in some embodiments, battery pack 500 may include frangible connections between one or more battery modules 100. Frangible connections are further described in U.S. application Ser. No. 17/319,182, filed on May 13, 2021, and entitled "CRASH SAFE BATTERY PACK FOR MEDIATING RISKS OF ELECTRICAL SHORT CIRCUITS DURING IMPACT," the entirety of which is hereby incorporated by reference in its entirety.

Figure 6:
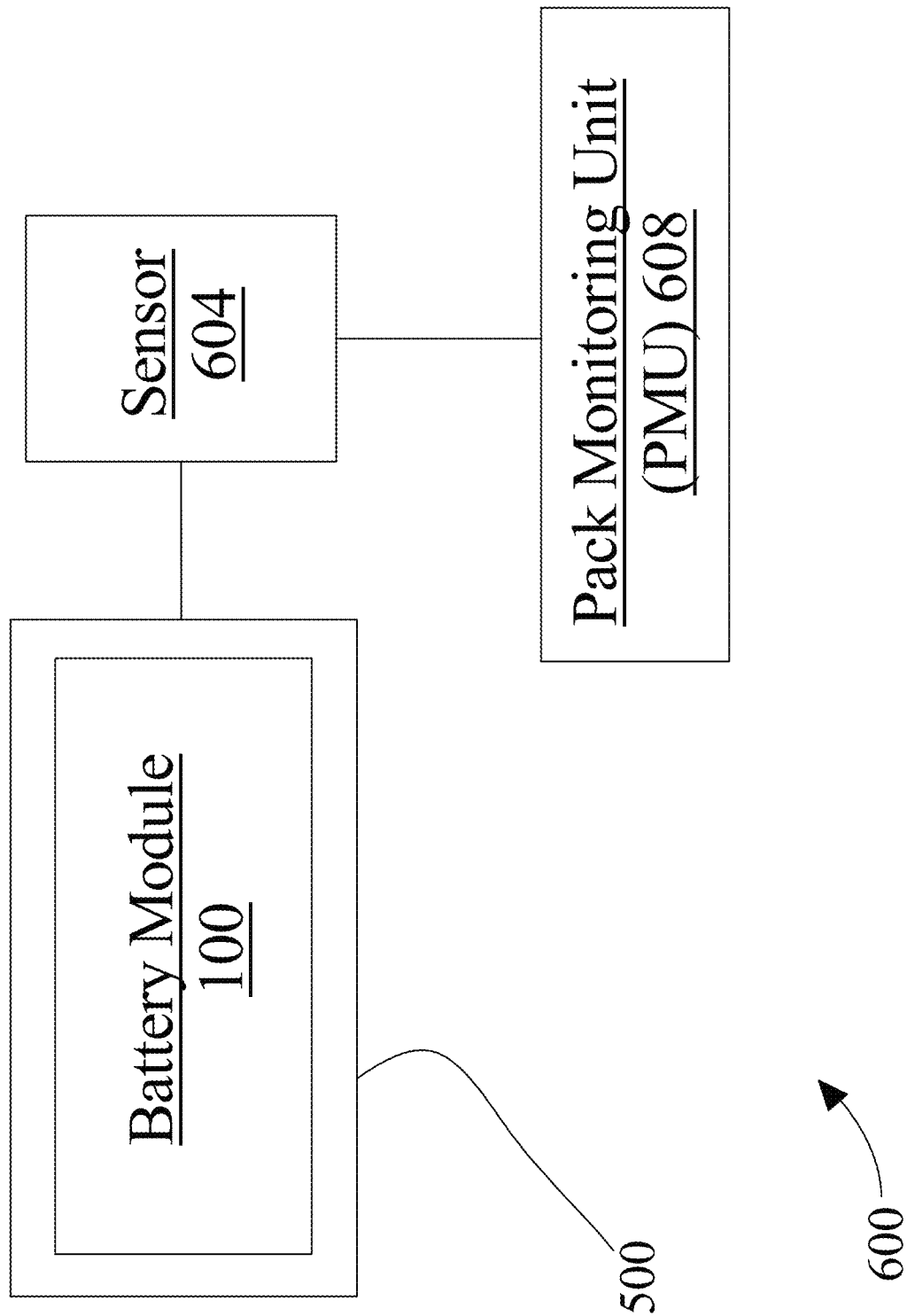
FIG. 6 is a block diagram of an exemplary embodiment of a pack monitoring system.

Referring now to FIG. 6, a pack monitoring system 600 is depicted. Pack monitoring system may include battery pack 500. Battery pack may include one or more of the at least a battery module 100. Battery pack 500 may be communicatively connected to sensor 604. In some embodiments, sensor 604 may be a component of a pack monitoring unit (PMU) 608. In some embodiments, sensor 604 may be communicatively connected to PMU 608. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, a communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 6, sensor 604 is configured to detect condition parameter of battery pack 500 and generate a battery datum based on the condition parameter. As used in this disclosure, a "sensor" is a device that is configured to detect an input and/or a phenomenon and transmit information and/or datum related to the detection; sensor may include an electronic sensor, which transmits information and/or datum electronically. As used in this disclosure, "battery datum" is an element of data encoding one or more condition parameters in an electrical signal such as a binary, analog, pulse width modulated, or other signal. For example, and without limitation, sensor 604 may transduce a detected phenomenon and/or characteristic of battery pack 500 or battery module 100, such as, and without limitation, temperature, voltage, current, pressure, temperature, moisture level, and the like, into a sensed signal. A sensor may include one or more sensors and may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. For example, and without limitation, sensor 604 may detect and/or measure a condition parameter, such as a temperature, of battery module 100. In one or more embodiments, a condition state of battery pack 500 or battery module 100 may include a condition state of a battery module 100.

With continued reference to FIG. 6, sensor 604 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, bolometers, voltage sensors, current sensors, and the like. Sensor 604 may be a contact or a non-contact sensor. For example, and without limitation, sensor 604 may be connected to battery module and/or battery cell of battery pack 500. In other embodiments, sensor 604 may be remote to battery module and/or battery cell. Sensor 604 may include a pressure sensor, a real time clock (RTC) sensor that is used to track the current time and date, a humidity sensor, an accelerometer/IMU, or other sensor. Sensor 604 may be configured to detect a condition parameter of the at least a battery module 100. In some embodiments, the condition parameter may be a temperature of the at least a battery module 100. In some embodiments, the condition parameter may be a current of the at least a battery module 100. In some embodiments, the condition parameter may be a voltage of the at least a battery module 100. In some embodiments, the sensor 604 may be configured to generate a sensor datum as a function of the condition parameter.

With continued reference to FIG. 6, system 600 may also include a PMU 608. PMU 608, in some embodiments, may be communicatively connected to sensor 604. In some embodiments, PMU 608 may be communicatively connected to battery pack 500 and or battery module 100. PMU 608 may be configured to collect a condition parameter of the battery pack 500. For the purposes of this disclosure, a "condition parameter" is detected electrical or physical input and/or phenomenon related to a state of a battery pack. In some embodiments, the condition parameter may be a temperature of the at least a battery module 100. In some embodiments, the condition parameter may be a current of the at least a battery module 100. In some embodiments, the condition parameter may be a voltage of the at least a battery module 100. In some embodiments, PMU 608 may be configured to receive a sensor datum from sensor 604. A state of a battery pack may include detectable information related to, for example, a temperature, a moisture level, a humidity, a voltage, a current, vent gas, vibrations, chemical content, or other measurable characteristics of battery pack 500 or components thereof, such as battery module 100. In some embodiments, PMU 608 may be communicatively connected to a flight controller like, for example, flight controller 804. PMU 608 and system 600 may be consistent with any PMU and PMU system, respectively, disclosed in U.S. patent application Ser. No. 17/528,896, filed on Nov. 17, 2021, and entitled "SYSTEMS AND METHODS FOR BATTERY MANAGEMENT FOR ELECTRIC AIRCRAFT BATTERIES," the entirety of which is hereby incorporated by reference.

With continued reference to FIG. 6, PMU 608 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. PMU 608 may include a single computing device operating independently, or may include two or more computing device operating in concert, in parallel, sequentially or the like; two or more computing devices may be included together in a single computing device or in two or more computing devices. PMU 608 may interface or communicate with one or more additional devices as described below in further detail via a network interface device. Network interface device may be utilized for connecting PMU 608 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. PMU 608 may include but is not limited to, for example, a computing device or cluster of computing devices in a first location and a second computing device or cluster of computing devices in a second location. PMU 608 may include one or more computing devices dedicated to data storage, security, distribution of traffic for load balancing, and the like. PMU 608 may distribute one or more computing tasks as described below across a plurality of computing devices of computing device, which may operate in parallel, in series, redundantly, or in any other manner used for distribution of tasks or memory between computing devices. PMU 608 may be implemented using a "shared nothing" architecture in which data is cached at the worker, in an embodiment, this may enable scalability of system 100 and/or computing device.

With continued reference to FIG. 1, PMU 608 may be designed and/or configured to perform any method, method step, or sequence of method steps in any embodiment described in this disclosure, in any order and with any degree of repetition. For instance, PMU 608 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. PMU 608 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
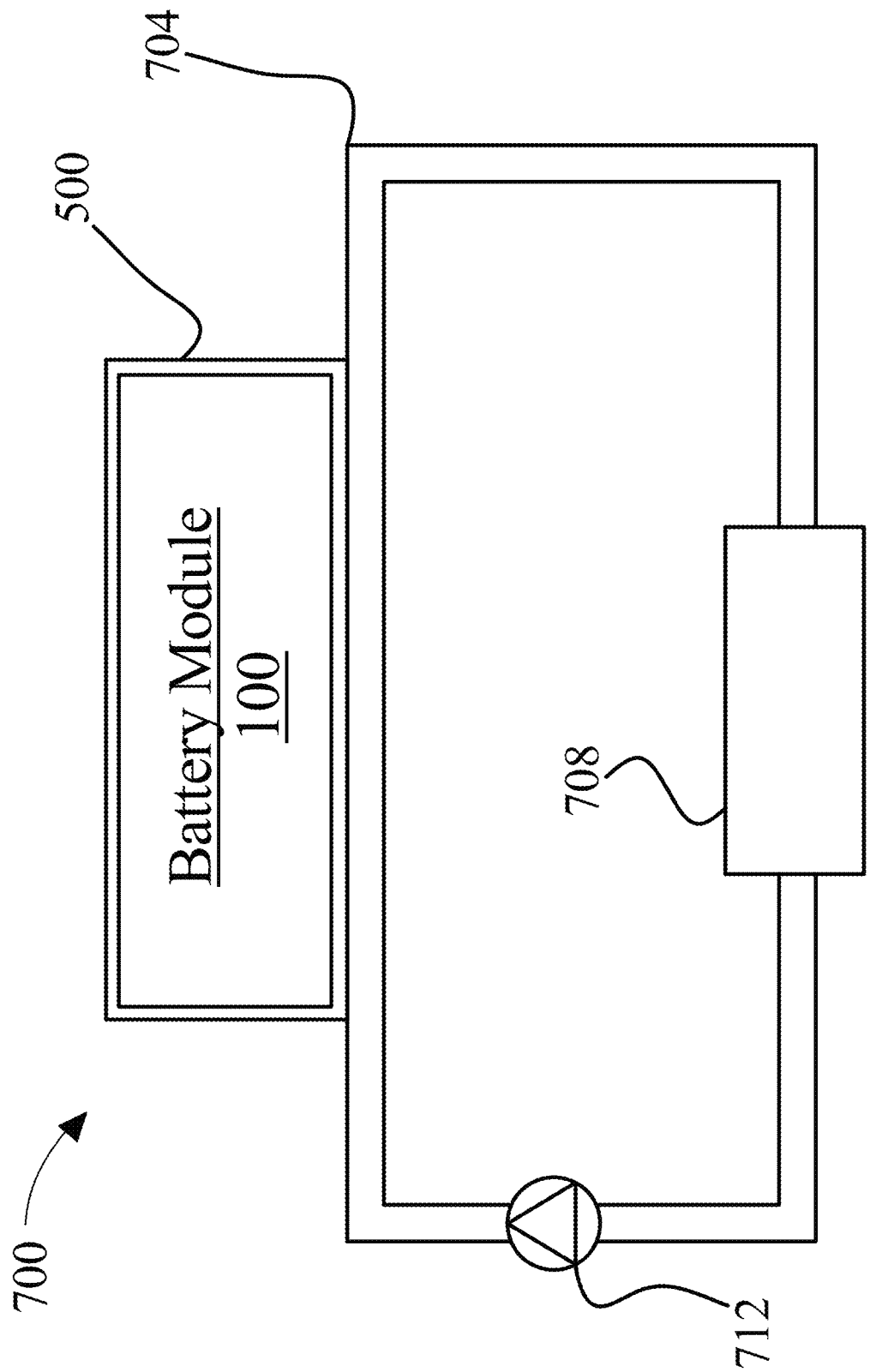
FIG. 7 is a diagram of an exemplary embodiment of an active cooling system.

Referring now to FIG. 7, an active cooling system 700 is depicted. The active cooling system contains at least a battery module 100. In some embodiments, one or more of the battery modules 100 may be thermally connected to a cooling conduit 704. In some embodiments, one or more battery modules 100 may be contained within a battery pack 500. In some embodiments, battery pack 500 may be thermally connected to cooling conduit 704.

With continued reference to FIG. 7, for the purposes of this disclosure, a "cooling conduit" is a passage that is designed to carry a coolant fluid. In some embodiments, cooling conduit 704 may configured to carry coolant fluid. Cooling conduit 704 contains a coolant fluid. In some embodiments, the coolant fluid may be air. In some embodiments, coolant fluid may be water. In some embodiments, the coolant fluid may be a liquid coolant. As a non-limiting example, the liquid coolant may comprise propylene glycol. As another non-limiting embodiment, the liquid coolant may comprise ethylene glycol. In some embodiments, the coolant fluid may be a mixture of one or more of the aforementioned coolant fluids. As a non-limiting example, the coolant fluid may comprise a mixture of water and a liquid coolant.

With continued reference to FIG. 7, system 700 may include a heat exchanger 708. Heat exchanger 708 may be thermally connected to cooling conduit 704. For the purposes of this disclosure, a "heat exchanger" is a system that transfers heat between two or more fluids. Heat exchanger 708 may be configured to dissipate heat from cooling conduit 704. By dissipating heat from cooling conduit 704, heat exchanger 708 may allow cooling conduit 704 to better provide cooling to battery module 100 and/or battery pack 500. In some embodiments heat exchanger 708 may include a heat sink. A "heat sink," for the purposes of this disclosure, is a passive heat exchanger that is configured to transfer heat from a device to a fluid medium.

With continued reference to FIG. 7, system 700 may include a pump 712. Pump 712 may be configured to move the coolant fluid through coolant conduit 704. Pump 712 may include a substantially constant pressure pump (e.g., centrifugal pump) or a substantially constant flow pump (e.g., positive displacement pump, gear pump, and the like). Pump 712 can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump 712 may be powered by any rotational mechanical work source, for example without limitation and electric motor or a power take off from an engine. Pump 712 may be in fluidic communication with at least a reservoir. In some cases, reservoir may be unpressurized and/or vented.

With continued reference to FIG. 7, aspects of cooling system 700 may be consistent with those disclosed in U.S. patent application Ser. No. 17/752,117, filed May 24, 2022, and entitled "APPARATUS FOR ACTIVE BATTERY PACK COOLING," which is hereby incorporated by reference in their entirety.

Figure 8:
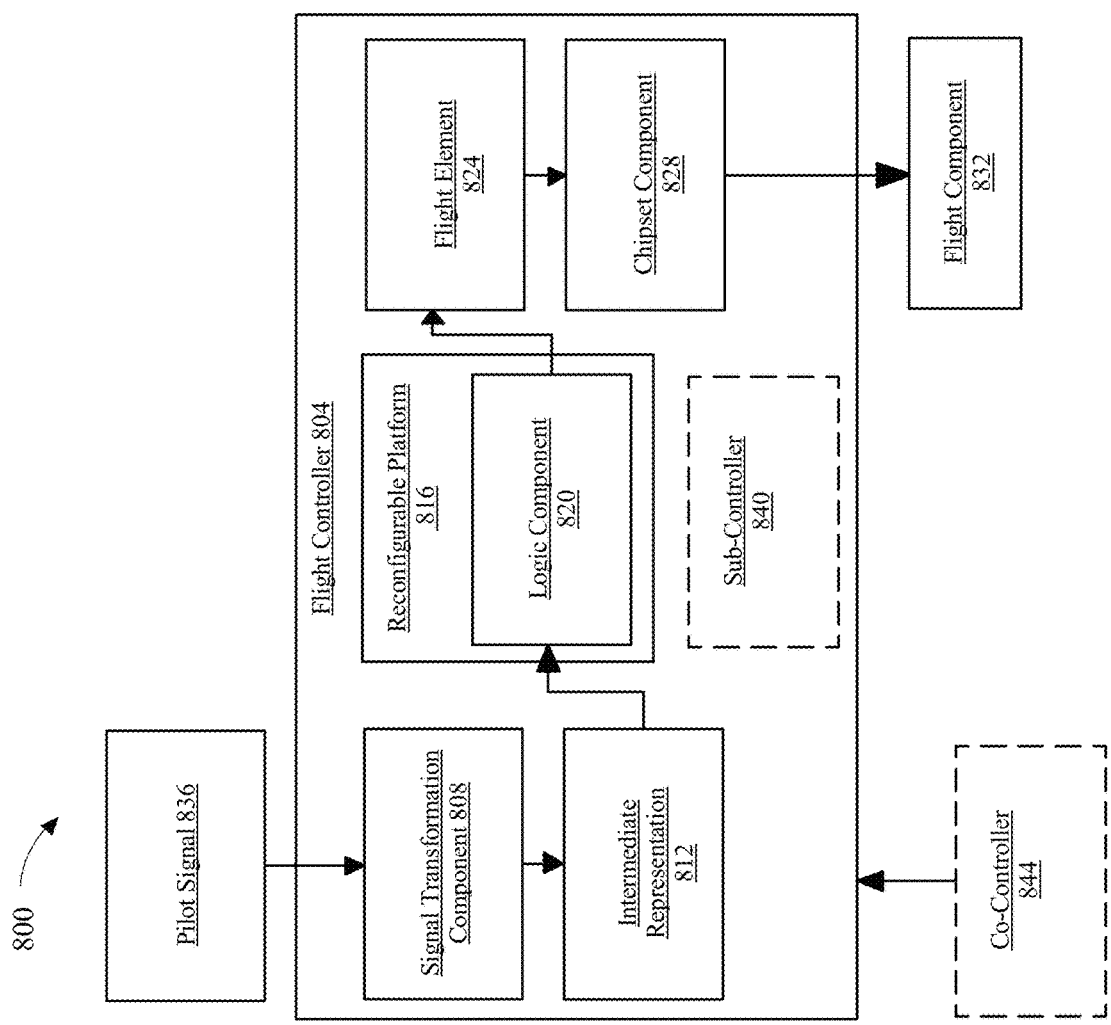
FIG. 8 is a block diagram an exemplary embodiment of a flight controller.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 832 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
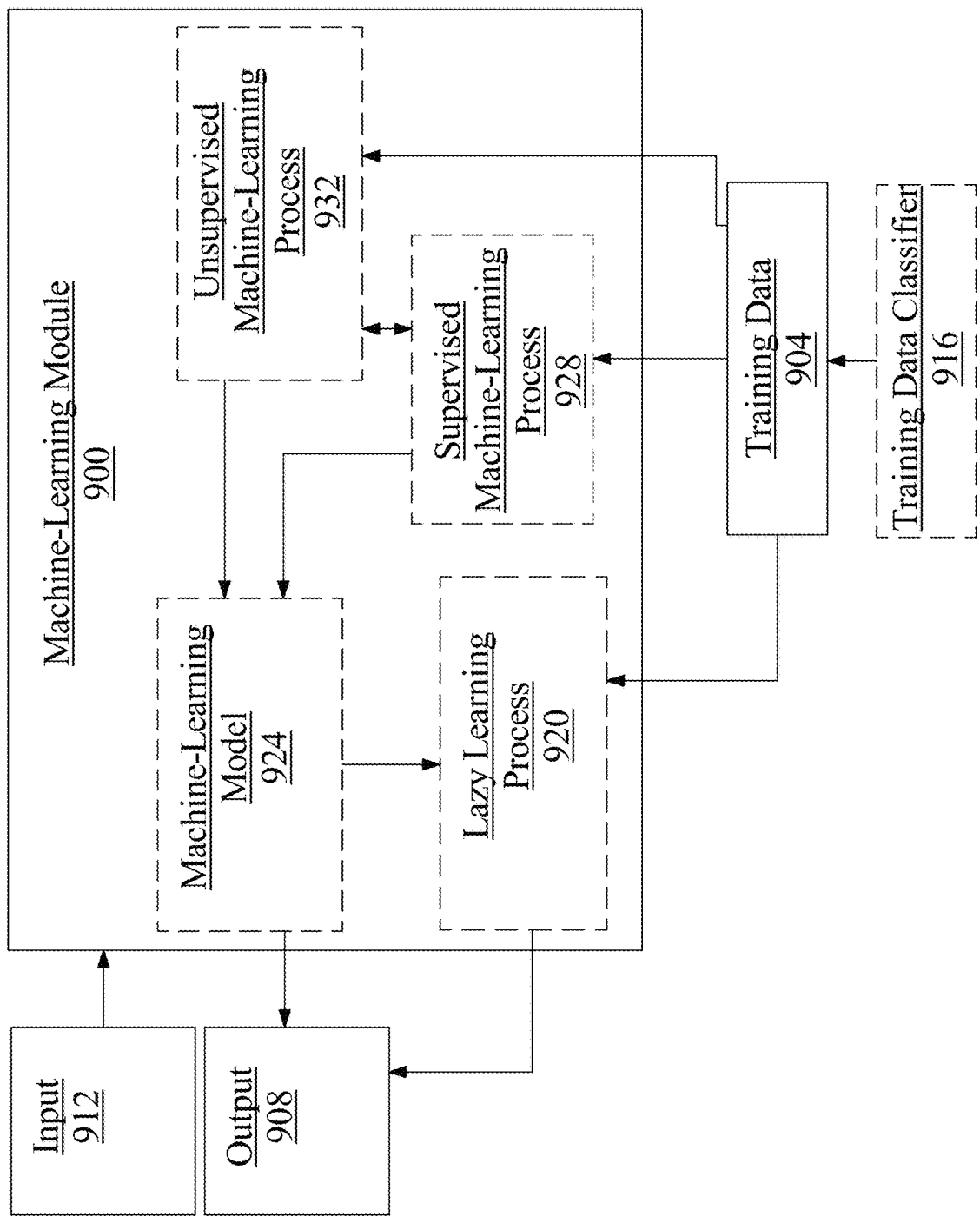
FIG. 9 is a block diagram of an exemplary embodiment of a machine learning module.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example flight elements and/or pilot signals may be inputs, wherein an output may be an autonomous function.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is Incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 10:
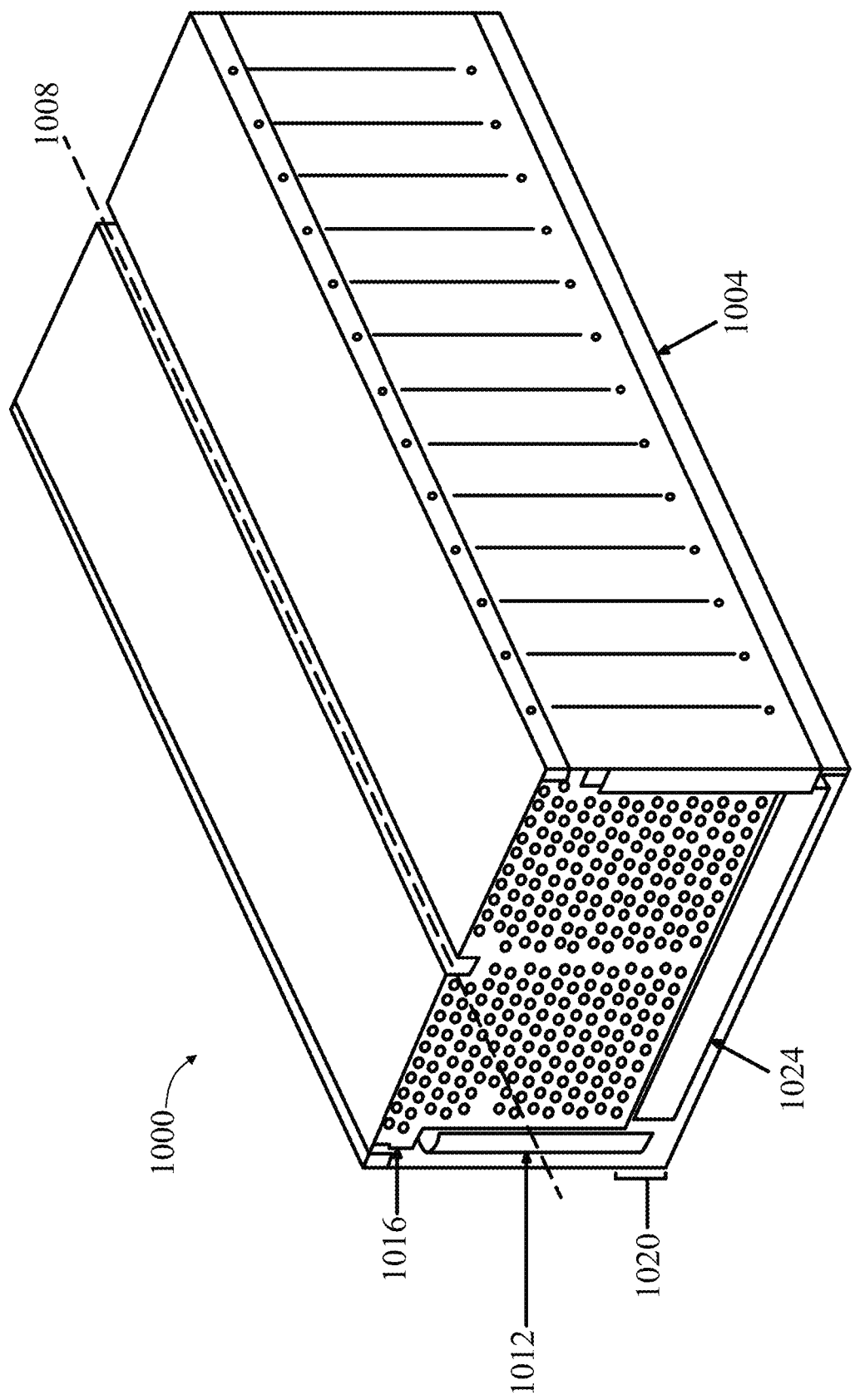
FIG. 10 is an illustration of an exemplary embodiment of a battery pack with a crush zone.

Referring now to the drawings, FIG. 10 illustrates an exemplary battery pack 1000 for failure safety with a crush zone. Battery pack 1000 may be consistent with battery pack 500. Battery pack 1000 includes a pack casing 1004. As used in this disclosure a "pack casing" is a rigid compartment and/or chamber that may hold and/or protect a plurality of components. In an embodiment, pack casing may include one or more materials capable of protecting the plurality of components located inside of the compartment and/or chamber. For example, and without limitation, a material may consist of wood, aluminum, steel, titanium, polymers, graphite-epoxy, composites, and the like thereof. As a further non, limiting example pack casing 1004 may include a material such as polycarbonate, acrylonitrile butadiene styrene, polypropylene, high impact polystyrene, and the like thereof. In an embodiment, pack casing may include an upper wall. As used in this disclosure an "upper wall" is a piece of material that encloses the upper portion of the compartment, wherein a material may include any of the materials as described above; upper wall may be or include a continuous piece of material. For example, upper wall may include a sheet of polypropylene that protects the compartment and or chamber from objects and/or the environment located above pack casing 1004. In an embodiment, upper wall of pack casing 1004 may include a recess 1008 located along a central longitudinal axis 1008. As used in this disclosure a "central longitudinal axis" is a directional axis that extends along a longitudinal direction from the rear of the pack casing to the front of the pack casing. Pack casing 1004 may include at least a side wall. As used in this disclosure a "side wall" is a piece of material that encloses one or more lateral portions of the compartment; side wall may be or include a continuous piece of material. Side wall may be configured with a high compression strength element. As used in this disclosure a "high compression strength element" is an element that has a large hardness rating and/or resists being squeezed together. In an embodiment high compression strength element may be determined as a function of a Mohs scale. For example and without limitation, a high compression strength element may include a material that has a 9 mohs scale value. In yet another embodiment, high compression strength element may be determined as a function of a Vickers hardness test. For example and without limitation, a high compression strength element may include a material that has a 180HV30 HV value. Pack casing 1004 may include a lower wall. In yet another embodiment, high compression strength element may include one or more arrangements of materials such as a honeycomb arrangement. In yet another embodiment, high compression strength element may include one or more element such as a foam and/or polymer described below. As used in this disclosure a "lower wall" is a piece of material that encloses the lower and/or bottom portion of the compartment; lower wall may be or include a continuous piece of material wherein a material may include any of the materials as described above. Lower wall may include one or more walls and/or materials that contact a ground below pack casing 1004.

Still referring to FIG. 10, pack casing 1004 is configured with an inner lining 1012. As used in this disclosure an "inner lining" is an inner panel located within pack casing 1004 that guides and/or directs battery module 1016 towards energy compressing material 1024 as a function of one or more grooved fittings. For example, and without limitation, inner lining may include one or more guide rail systems that adopt a grooved structure and are arranged to orient and/or guide a falling and/or moving object in a direction. In an embodiment, inner lining 1012 may be secured to the side wall of pack casing 1004 to guide battery module 1016. Inner lining 1012 may be secured as a function of one or more attaching mechanisms such as bolting, riveting, welding, press fitting, and the like thereof as described above in detail. Further, inner lining 1012 may be secured as a function of one or more blind and/or pop rivets, solid and/or round head rivets, oxy-acetylene welds, electric arc welds, shielded metal arc welds, gas metal arc welds, composite press-fit inserts, and/or one or more locking methods such as, but not limited to friction locking methods, mechanical locking methods, adhesive locking methods, and the like thereof. In yet another embodiment, inner lining 1012 may be composed of one or more rigid elements that at least provide structure for battery module 1016 to be guided. For example, and without limitation, inner lining 1012 may be composed of one or more rigid elements such as polycarbonate, acrylonitrile butadiene styrene, polypropylene, high impact polystyrene, perfluoroalkoxy alkane, polytetrafluoroethylene, polyvinylidene fluoride, ceramic, and the like thereof. As a further non-limiting example, inner lining 1012 may include one or more metals such as stainless steel, duplex alloys, nickel, nickel-based alloys, titanium, titanium alloys, and the like thereof.

Still referring to FIG. 10, battery pack 1000 includes a battery module 1016 of a plurality of battery modules. As used in this disclosure a "battery module" is a module comprising a plurality of battery cells wired together in series and/or in parallel. In an embodiment, and without limitation, battery cells may be wired together using any connection permitting electric conduction, such as but not limited to plug and socket connectors, crimp-on connectors, soldered connectors, insulation-displacement connectors, binding posts, screw terminals, ring and spade connectors, blade connectors, and the like thereof. In an embodiment, battery module 1016 may be disposed between upper wall, side wall, and/or lower wall such that they are enclosed within at least 4 sides of the pack casing 1004. In an embodiment, a battery module may be disposed in or on an eVTOL aircraft and may provide power to at least a portion of an aircraft in flight or on the ground, for example, the battery module may provide power within an entire flight envelope of an aircraft including, for example, emergency procedures. In an embodiment, and without limitation, battery module 1016 may be used to provide a steady supply of electrical power to a load over the course of a flight by a vehicle or other electric aircraft. For example, the battery module 1016 may be capable of providing sufficient power for "cruising" and other relatively low-energy phases of flight. Battery module 1016 may also be capable of providing electrical power for some higher-power phases of flight as well, particularly when the energy source is at a high SOC, as may be the case for instance during takeoff. In an embodiment, battery module 1016 may be capable of providing sufficient electrical power for auxiliary loads including without limitation, lighting, navigation, communications, de-icing, steering or other systems requiring power or energy. Further, battery module 1016 may be capable of providing sufficient power for controlled descent and landing protocols, including, without limitation, hovering descent or runway landing. As used herein batter module 1016 may have high power density where the electrical power the battery module may usefully produce per unit of volume and/or mass is relatively high. The electrical power is defined as the rate of electrical energy per unit time. Battery module 1016 may include a device for which power that may be produced per unit of volume and/or mass has been optimized, at the expense of the maximal total specific energy density or power capacity, during design.

The battery module, as a whole, may comprise hardware for mechanical and electrical coupling to at least a portion of eVTOL aircraft. In an embodiment battery module 1016 may include a plurality of battery cells. The plurality of battery cells may be consistent with any plurality of battery cells disclosed as part of this disclosure. Battery cells may be disposed and/or arranged within a respective battery module 1016 in groupings of any number of columns and rows. For example and without limitation, battery cells may be arranged in battery module 1016 with 18 cells in two columns. One of skill in the art will understand that battery cells may be arranged in any number to a row and in any number of columns and further, any number of battery cells may be present in battery module 1016. In an embodiment and without limitation, battery cells within a first column may be disposed and/or arranged such that they are staggered relative to battery cells within a second column. In this way, any two adjacent rows of battery cells may not be laterally adjacent but instead may be respectively offset a predetermined distance. In another embodiment, any two adjacent rows of battery cells may be offset by a distance equal to a radius of a battery cell. This arrangement of battery cells is only a non-limiting example and in no way preclude other arrangement of battery cells.

Still referring to FIG. 10, battery cells may each comprise a cell configured to include an electrochemical reaction that produces electrical energy sufficient to power at least a portion of an eVTOL aircraft. Battery cell may include electrochemical cells, galvanic cells, electrolytic cells, fuel cells, flow cells, voltaic cells, or any combination thereof—to name a few. In an embodiment, battery cells may be electrically connected in series, in parallel, or a combination of series and parallel. As used in this disclosure a "series connection" is wiring a first terminal of a first cell to a second terminal of a second cell and further configured to comprise a single conductive path for electricity to flow while maintaining the same current (measured in Amperes) through any component in the circuit. Battery cells may use the term 'wired', but one of ordinary skill in the art would appreciate that this term is synonymous with 'electrically connected', and that there are many ways to couple electrical elements like battery cells together. For example and without limitation, battery cells can be coupled via prefabricated terminals of a first gender that mate with a second terminal with a second gender. As used in this disclosure a "parallel connection" is wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in any arrangement which may confer onto the system the electrical advantages associated with that arrangement such as high-voltage applications, high-current applications, or the like. As used in this disclosure an "electrochemical cell," is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. Non-limiting examples of battery cells may include battery cells used for starting applications including Li ion batteries cells which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations. A battery cell may include, without limitation a battery cell using nickel based chemistries such as nickel cadmium or nickel metal hydride, a battery cell using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery cell using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as battery cells.

Still referring to FIG. 10, battery module 1016 is secured to pack casing 1004 by a battery module connection. As used in this disclosure a "battery module connection" is a component and/or mechanism that secures battery module 1016 to pack casing 1004. Battery module connection may be accomplished, without limitation, by bolting, riveting, welding, press fitting, and the like thereof. For example, and without limitation a solid and/or round head rivet may be used to attach battery module 1016 to pack casing 1004. As a further non-limiting example, a blind and/or pop rivet may be used to attach battery module 1016 to pack casing 1004. As a further non-limiting example, an oxy-acetylene weld and/or electric arc weld may be used to attach battery module 1016 to pack casing 1004. As a further non-limiting example, a shielded metal arc weld and/or gas metal arc weld may be used to attach battery module 1016 to pack casing 1004. As a further non-limiting example, a composite press-fit insert may be used to attach battery module 1016 to pack casing 1004. Battery module connection may be accomplished, without limitation, by one or more locking methods. For example, and without limitation battery module connection may include a friction locking method that may secure battery module 1016 to case 1004 as a function of increasing resistance between contact surfaces. In an embodiment and without limitation, friction locking method may include the implementation of one or more split ring washers, serrated washers, tooth lock washers, nylon insert nuts, double nuts, and the like thereof. As a further non-limiting example, battery module connection may include a mechanical locking method that may secure battery module 1016 to packing case 1004 as a function of a physical barrier that may prevent the fastener from rotating. In an embodiment and without limitation, mechanical locking method may include the implementation of one or more tab washers, locking wires, and the like thereof. As a further non-limiting example, battery module connection may include an adhesive locking method that may secure battery module 1016 to packing case 1004 as a function of applying a chemical to prevent a bolted joint from loosening. In an embodiment and without limitation, adhesive locking method may include the implementation of one or more adhesives such as methacrylate-based thread-locking fluids with low strength, medium strength, high strength, high temperature, penetrating, and the like thereof.

In an embodiment, and still referring to FIG. 10, battery module connection may include any means for attachment that is configured to disconnect under a predetermined load. In some cases, battery module connections may be passive and rely upon loading forces for disconnection, such as exemplary battery module connections which may include one or more of a shear pin, a frangible nut, a frangible bolt, a breakaway nut, bolt, or stud, and the like. In some cases, a passive battery module connection may include a relatively soft or brittle material (e.g., plastic) which is easily broken under achievable loads. Alternatively or additionally, battery module connection may include a notch, a score line, or another weakening feature purposefully introduced to the mount to introduce breaking at a prescribed load. According to some embodiments, a canted coil spring may be used to as part of a battery module connection, to ensure that the mount disconnects under a predetermined loading condition. In some cases a mount may comprise a canted coil spring, a housing, and a piston; and sizes and profiles of the housing and the piston may be selected in order to prescribe a force required to disconnect the mount. Alternatively or additionally, battery module connection may include an active feature which is configured to actively disconnect a mount under a prescribed condition (for instance a rapid change in elevation or large measured G-forces). For example, and without limitation, an active mount may be configured to actively disconnect during a sensed crash. An active mount may, in some cases, include one or more of an explosive bolt, an explosive nut, an electro-magnetic connection, and the like. In some cases, one or more battery module connections may be configured to disconnect under a certain loading condition, for instance a force in excess of a predetermined threshold (i.e., battery breakaway force) acting substantially along (e.g., within about +/−45°) a predetermined direction.

In an embodiment and still referring to FIG. 10, pack casing 1004 may include an external shell to protect battery module 1016. As used in this disclosure an "external shell" is a rigid structure that absorbs and/or prevents an initial impact energy from an external source, wherein an external source is one or more objects and/or items that are located outside of pack casing 1004. For example, and without limitation, may include a rigid structure such as polycarbonate, acrylonitrile butadiene styrene, polypropylene, high impact polystyrene, perfluoroalkoxy alkane, polytetrafluoroethylene, polyvinylidene fluoride, ceramic, and the like thereof. As a further non-limiting example, external shell may include one or more polymers such as shock absorbing polymers, visco-elastic polymers, visco polymers, polyurethanes, and the like thereof. As a further non-limiting example, external shell may include one or more metals such as stainless steel, duplex alloys, nickel, nickel-based alloys, titanium, titanium alloys, and the like thereof.

Still referring to FIG. 10, battery pack 1000 includes a crush zone 1020. As used in this disclosure a "crush zone" is a region within pack casing 1004 that is designed to compress and/or crush to absorb a force. Crush zone 1020 may be configured to prevent a thermal runaway of battery module 1016. As used in this disclosure "thermal runaway" is an accelerated increase in temperature of battery module 1016 as a function of current flowing through battery module 1016 rapidly. For example and without limitation, thermal runaway may result in explosions and/or overheating as a function of battery module 1016 being physically damaged and/or harmed as a function of an external force. Crush zone 1020 is located beneath battery module 1016. Crush zone may include a location and/or region produced as a function of battery module 1016 of the plurality of battery modules being secured to the upper wall of pack casing 1004. Battery module may be secured to upper wall of pack casing 1004 as a function of one or more battery module connections. For example, and without limitation, crush zone 1020 may include a predetermined amount of space between battery module 1016 and lower wall of pack casing as a function of a plurality of nuts and bolts that may be utilized to secure battery module 1016 to the upper wall of pack casing to at least raise battery module 1016. In an embodiment and without limitation, crush zone 1020 may include a thickness parameter. As used in this disclosure a "thickness parameter" is a predetermined amount of distance and/or space that separates the lower wall of packing case 1004 and the bottom of battery module 1016. In an embodiment and without limitation, thickness parameter may include a predetermined distance of 15 cm and/or 5.91 inches. As a further non-limiting example, thickness parameter may include a predetermined distance of 2 meters and/or 78.74 inches. In an embodiment, and without limitation, thickness parameter may be determined as a function of an impact energy. As used in this disclosure an "impact energy" is an energy produced as a function of an impact. For example, and without 45 imitationn, impact energy may be determined to be 40 N, wherein the thickness parameter is adjusted to allow for an absorption of 40 N of energy.

In an embodiment and still referring to FIG. 10, crush zone 1020 may be configured as a to reduce an impact force. As used in this disclosure an "impact force" is a force that is generated as a function of a vertical drop from a given height. Impact force may be generated as a function of the weight and/or size of the battery module falling, the velocity prior to impacting the ground, the height of the vertical drop, and/or the distance traveled after initial impact with the ground. For example, impact force may be 40.83 N for a vertical drop of 6 meters of a 5 kg battery module. In an embodiment and without limitation, crush zone 1020 may be configured to reduce impact force as a function of increasing the distance traveled after initial impact. For example and without limitation, an impact force may be 2,940,000 N for a vertical drop of 3000 m of a 10 kg battery module, wherein there is no travel after impact, wherein an impact force may be 98,000 N for the same vertical drop of 3000 m of a 10 kg battery module, wherein there is a 3 m distance after initial impact. As a further non-limiting example, an impact force an aircraft vertical drop may be 2,450,000,000 N for a vertical drop of 2500 m of a 10,000 kg aircraft, wherein this is no travel after impact, wherein an impact force of 49,000,000 N for the same vertical drop of the aircraft of 2500 m of a 10,000 kg aircraft, wherein there is a 5 m distance traveled after impact. In an embodiment, and without limitation, crush zone may be determined as a function of a maximum aircraft vertical drop. As used in this disclosure a "maximum aircraft vertical drop" is the estimated vertical drop of an aircraft at its maximum height in a given flight path. For example, a maximum height for a flight path may be 2561 meters.

Still referring to FIG. 10, crush zone 1020 is comprised of an energy absorbing material 1024. As used in this disclosure an "energy absorbing material" is a material and/or substance capable of absorbing a force. For example, and without limitation, energy absorbing material 1024 may include one or more energy absorbing characteristics such as conductivity, flame resistance, density, absorption, structure, and the like thereof as described in detail below, in reference to FIG. 3. In some cases, energy absorbing material 1024 may be configured to absorb and/or dissipate energy as it is compressed. In some cases, energy absorbing material 1024 may include a material having a number of voids, for instance compressible material may take a form of a honeycomb or another predictably cellular form. Alternatively or additionally, energy absorbing material 1024 may include a non-uniform material, such as without limitation a foam. As a further non-limiting example, energy absorbing material 1024 may include a polyether ether ketone material. As a further non-limiting example, energy absorbing material 1024 may include a polymer foam. As a further non-limiting example, energy absorbing material 1024 may include a non-newtonian polymer. Energy absorbing material 1024 may include a polymer and/or other dampening material such as a foam, gel, fluid, mesh, and the like thereof. For example, and without limitation, energy absorbing material may include a polycarbonate polymer, polypropylene polymer, polystyrene polymer, urethane foam polymer, shock absorbing polymer, visco-elastic polymer, visco polymer, and the like thereof. As a further non-limiting example, energy absorbing material may include one or more materials that reduce one or more shock energies, vibration energies, frequencies, and the like thereof.

Still referring to FIG. 10, energy absorbing material 1024 is configured to compress as a function of a crash force. As used in this disclosure a "crash force" is a force exerted on battery pack 1000 as a function of one or more crashes and/or impacts. In an embodiment crash force may be exerted on battery pack 1000 as a function of an aircraft crash and/or vehicular crash. Energy absorbing material 1024 may be configured to compress as a function of absorbing a predetermined amount of force, wherein a predetermined amount of force may include an applied load magnitude acting on energy absorbing material. For example, and without limitation, an applied load magnitude may act to reduce the length and/or thickness of energy absorbing material as a function of squeezing the material between battery module 1004 and the lower wall of pack casing 1004 due to the load exceeding the compressive strength of energy absorbing material. In another embodiment predetermined amount of force may include a suddenly applied load. For example, and without limitation, suddenly applied load may exceed the impact strength of energy absorbing material 1024, wherein energy absorbing material 1024 compresses as a function of the suddenly applied load. In yet another embodiment, energy absorbing material 1024 may be configured to absorb a predetermined direction of force, wherein a predetermined direction of force may include a directional load and/or force acting on energy absorbing material. For example, and without limitation, a vertical direction of force may result in a compression of energy absorbing material 1024 at a specified magnitude of force, wherein a horizontal direction of force may result in a lesser and/or no compression of energy absorbing material 1024. As a further non-limiting example, a horizontal direction of force may result in a compression of energy absorbing material 1024 at a specified magnitude of force, wherein a vertical direction of force may result in a lesser and/or no compression of energy absorbing material 1024.

In an embodiment, and still referring to FIG. 10, crash force may include an excessive force. As used in this disclosure an "excessive force" is a landing force that exceeds a landing force threshold. As used in this disclosure a "landing force threshold" is a maximum force that may be achieved during the landing of an aircraft. For example, and without limitation a landing force threshold may be a force that is calculated relative to a specific amount of force greater than gravity, wherein the force exerted on the aircraft by gravity is determined by $$F = G\frac{m_1 m_2}{r^2}$$

wherein F is the force exerted on the aircraft by gravity, G is the gravitational constant, $m_1$ is the mass of the aircraft, $m_2$ is the mass of the earth, and r is the distance between the centers of the masses.

In an embodiment and still referring to FIG. 10, battery module connection releases battery module 1016 into crush zone 1020 guided by inner lining 1012. In yet another embodiment, inner lining 1012 may be configured to guide battery module 1016 to the ground. For example, and without limitation, inner lining 1012 may be configured to allow battery module 1016 to move in a vertical direction and/or along a y-axis. In an embodiment, and still referring to FIG. 10, battery module connection releasing battery module 1016 further comprises breaking a frangible buswork. As used in this disclosure a "frangible buswork" is one or more connections and/or buswork attached to battery module 1016 that are fragile and/or brittle, wherein a buswork is one or more conductors and/or group of conductors that serve as a common connection for two or more electrical circuits. For example, and without limitation, frangible buswork may include one or more fuse bolts, special material bolts, frangible couplings, tear-through fasteners, tear-out sections, and the like thereof. As a further non-limiting example, frangible buswork may include one or more electrical connections such as plug and socket connectors, crimp-on connectors, soldered connectors, binding posts, screw terminals, ring and spade connectors, blade connectors, and the like thereof.

Still referring to FIG. 10, battery module connection may be configured to release battery module 1016 as a function of the crash force exceeding a breakaway force. As used in this disclosure a "breakaway force" is an amount of force required to break and/or release at least a battery module connection that is securing battery module 1016 to pack casing 1004. For example, and without limitation, breakaway force may include a force of 200 N to break a battery module connection that secures battery module 1016 from pack casing 1004. As a further non-limiting example, breakaway force may include a force of 5,000 N to release a plurality of battery module connections that secure battery module 1016 from pack casing 1004. In an embodiment and without limitation, breakaway force may be a function of the one or more attachment mechanisms securing battery module 1016 to pack casing. For example, and without limitation, breakaway force for a nut and bolt may be 720 N, wherein breakaway force for an electric arc weld may be 2000 N. In this manner, one or more breakaway forces may be established for battery module 1016, prior to breaking and/or releasing battery module connection.

In an embodiment, and still referring to FIG. 10, breakaway force may be configured as a function of a predetermined amount of force. For example, and without limitation, a predetermined amount of force may include a threshold force. As used in this disclosure a "threshold force" is an amount of force required to reach a threshold for releasing and/or breaking the secured attachment of battery module 1016 to pack casing 1004. For example, and without limitation threshold force may be 6,000 N to break battery module connection, wherein breaking battery module connection breaks the secured attachment of battery module 1016 to pack casing 1004 allowing battery module to be guided towards energy absorbing material 1024 as a function of inner lining 1012. As a further non-limiting direction threshold force may include a force of 2,000 N to release battery module connection, wherein releasing battery module connection allows battery module 1016 to be guided down inner lining 1012 and interact with energy absorbing material without breaking battery module connection. In an embodiment threshold force may include a releasing level. As used in this disclosure a "releasing level" is an amount of force required to release the battery module connection that secures battery module 1016 to pack casing in a controlled and/or timed release. For instance, and without limitation, releasing level may release battery module 1016 over a 30 second release period to allow for energy absorbing material to absorb a greater amount of impact force.

Still referring to FIG. 10, breakaway force may be configured as a function of a predetermined direction of force. For example, and without limitation, a predetermined direction of force may denote that a force exerted on battery module connection and/or pack casing in the vertical direction may result in breakage of battery module connection at a specified magnitude of force, wherein a horizontal direction of force may result in no breakage of battery module connection. As a further non-limiting example, predetermined direction of force may denote that a force exerted on battery module connection and/or pack casing at an angle of greater than 30° may initiate a release of battery module connection from pack casing, wherein releasing battery module connection from pack casing results in the movement of battery module 1016 downwards towards energy absorbing material 1024.

Still referring to FIG. 10, battery pack 1000 may further comprise a secondary crush zone. As used in this disclosure a "secondary crush zone" is a region within pack casing 1004 that is generated as a function of battery module 1016 shifting downwards and compressing energy absorbing material 1024. In an embodiment, secondary crush zone may be located between the upper wall of pack casing 1004 and the top of battery module 1016. For example, and without limitation, secondary crush zone may increase in thickness as battery module 1016 compresses energy absorbing material 1024. In an embodiment, the thickness of secondary crush zone may be similar to the thickness of crush zone 1020. For example, battery module 1016 may compress energy absorbing material 1024 as a function of shifting downward guided by inner lining 1012, wherein secondary crush zone increases in thickness relative to the amount of compression that occurs in energy absorbing material 1024. As a further non-limiting example, secondary zone compression may be 4 due to battery module 1016 compressing energy absorbing material 1024 4 cm. In another embodiment, secondary crush zone may protect battery module 1016 from one or more debris and/or aircraft parts. For example, and without limitation, secondary crush zone may provide a predetermined distance between the upper wall of pack casing 1004 and providing protection impact from external stimulus in the vertical direction, wherein the predetermined distance is determined as a function of the thickness of crush zone 1020. In another embodiment, secondary crush zone may protect battery module 1016 from one or more airframe impacts. As used in this disclosure an "airframe impact" is an impact on pack casing 1004 as a function of one or more aircraft frame parts. For example, and without limitation an aircraft frame part of the fuselage may land on top of and/or vertically impact the pack casing, wherein secondary crush zone may provide protection for battery module 1016.

Further disclosure regarding battery pack 1000 may be found in U.S. application Ser. No. 17/319,201, filed May 13, 2021, and entitled "BATTERY PACK FOR FAILURE SAFETY," the entirety of which is hereby incorporated by reference in its entirety.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
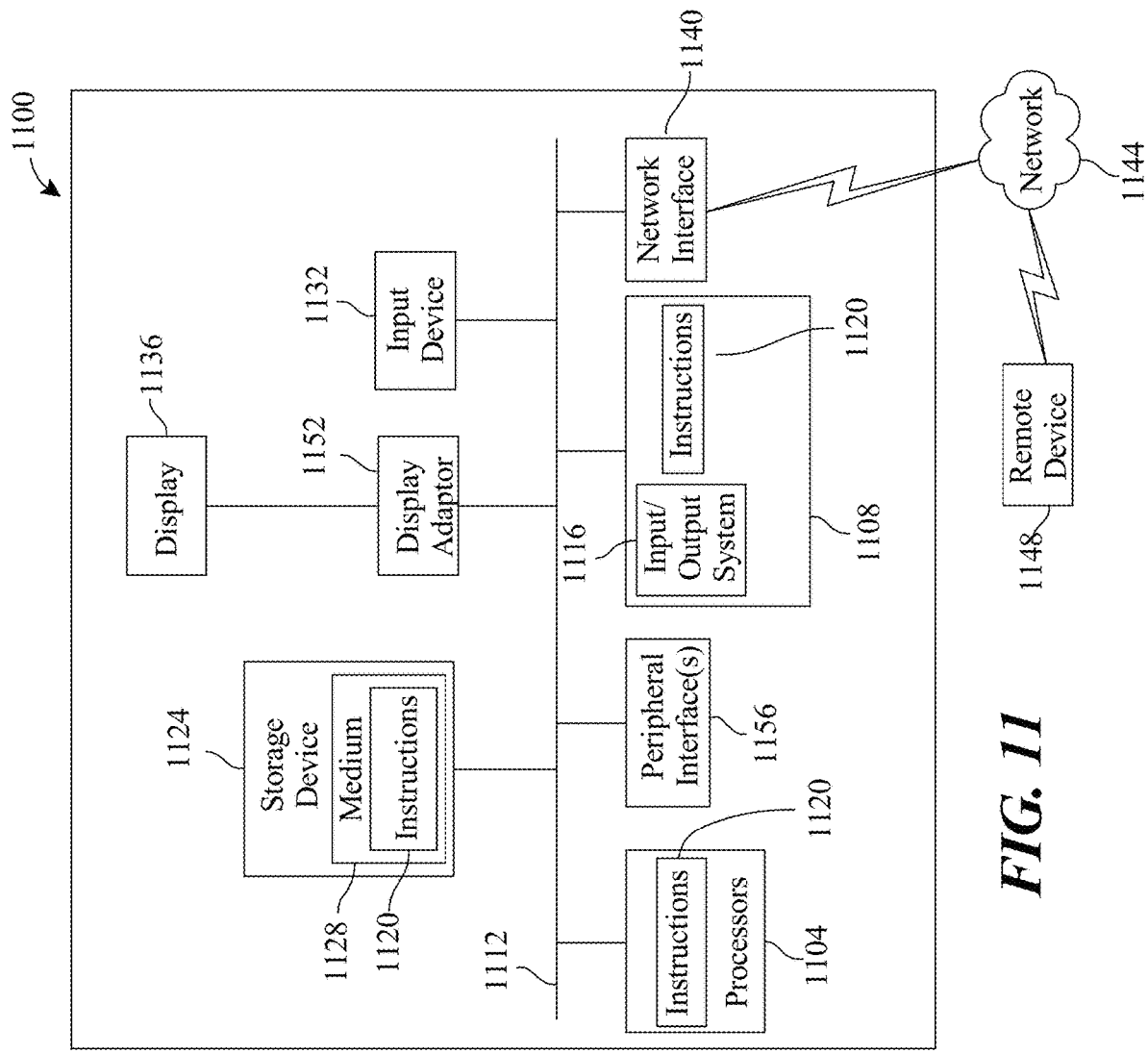
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIRE-WIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to apparatuses and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft with increased crash robustness, the aircraft comprising:
   a fuselage, wherein the fuselage has a forward end, an opposite rear end, a ventral surface, and a dorsal surface;
   a longitudinal axis running from the rear end to the forward end;
   a dorsoventral axis orthogonal to the longitudinal axis and running from the dorsal surface to the ventral surface; and
   at least a battery module disposed within the fuselage, wherein:
      the at least a battery module comprises a plurality of battery cells, the plurality of battery cells each comprising a cylindrical body;
      each battery cell of the plurality of battery cells includes an axial axis, each axial axis extending along an axis of radial symmetry of each cylindrical body, positioned orthogonally to each of the longitudinal axis and the dorsoventral axis;
      each battery cell of the plurality of battery cells has a plurality of radial axes extending from each axis of radial symmetry towards each cylindrical body and orthogonal to each axial axis, wherein the plurality of radial axes of each battery cell includes a first radial axis aligned with the longitudinal axis and a second radial axis aligned with the dorsoventral axis; and
      a front portion of each cylindrical body extends towards the forward end and a ventral portion of each cylindrical body extends towards the ventral surface.

2. The aircraft of claim 1, wherein the at least a battery module is part of a battery pack, wherein the battery pack further comprises a crush zone located beneath the battery pack.

3. The aircraft of claim 2, wherein the crush zone comprises an energy absorbing material configured to compress as a function of a crash force.

4. The aircraft of claim 2, wherein:
   the battery pack comprises a pack casing;
   the at least a battery module is secured to the pack casing by a battery module connection; and
   the battery module connection releases the battery module into the crush zone.

5. The aircraft of claim 4, wherein the battery module connection is configured to release the battery module when a crash force exceeds a breakaway force.

6. The aircraft of claim 4, wherein the at least a battery module comprises frangible buswork.

7. The aircraft of claim 1, further comprising an active battery cooling system, the active battery cooling system comprising a coolant conduit, wherein the coolant conduit is thermally connected to the at least a battery module.

8. The aircraft of claim 7, wherein the active battery cooling system comprises a heat exchanger, wherein the heat exchanger is thermally connected to the coolant conduit.

9. The aircraft of claim 8, wherein the coolant conduit is configured to carry a coolant fluid.

10. The aircraft of claim 9, wherein the coolant fluid is water.

11. The aircraft of claim 9, wherein the coolant fluid is propylene glycol.

12. The aircraft of claim 9, wherein the coolant fluid is ethylene glycol.

13. The aircraft of claim 9, wherein the active battery cooling system further comprises a pump, wherein the pump is configured to move the coolant fluid through the coolant conduit.

14. The aircraft of claim 1, wherein the at least a battery module comprises a plurality of battery modules, wherein the plurality of battery modules are part of a battery pack.

15. The aircraft of claim 14, wherein the at least a battery module comprises at least a sensor, the at least a sensor configured to:
   detect a condition parameter of the at least a battery module; and
   generate a sensor datum as a function of the condition parameter.

16. The aircraft of claim 15, wherein:
   the sensor is a temperature sensor; and
   the condition parameter is a temperature of the at least a battery module.

17. The aircraft of claim 15, further comprising a pack monitoring unit, wherein:
   the pack monitoring unit is communicatively connected to the sensor; and
   the pack monitoring unit is configured to receive the sensor datum.

18. The aircraft of claim 17, wherein the pack monitoring unit is communicatively connected to the battery pack.

19. The aircraft of claim 15, wherein:
   the sensor is a current sensor; and
   the condition parameter is the current of the at least a battery module.

20. The aircraft of claim 15, wherein:
   the sensor is a voltage sensor; and the condition parameter is the voltage of the at least a battery module.

* * * * *